UNITED STATES PATENT OFFICE.

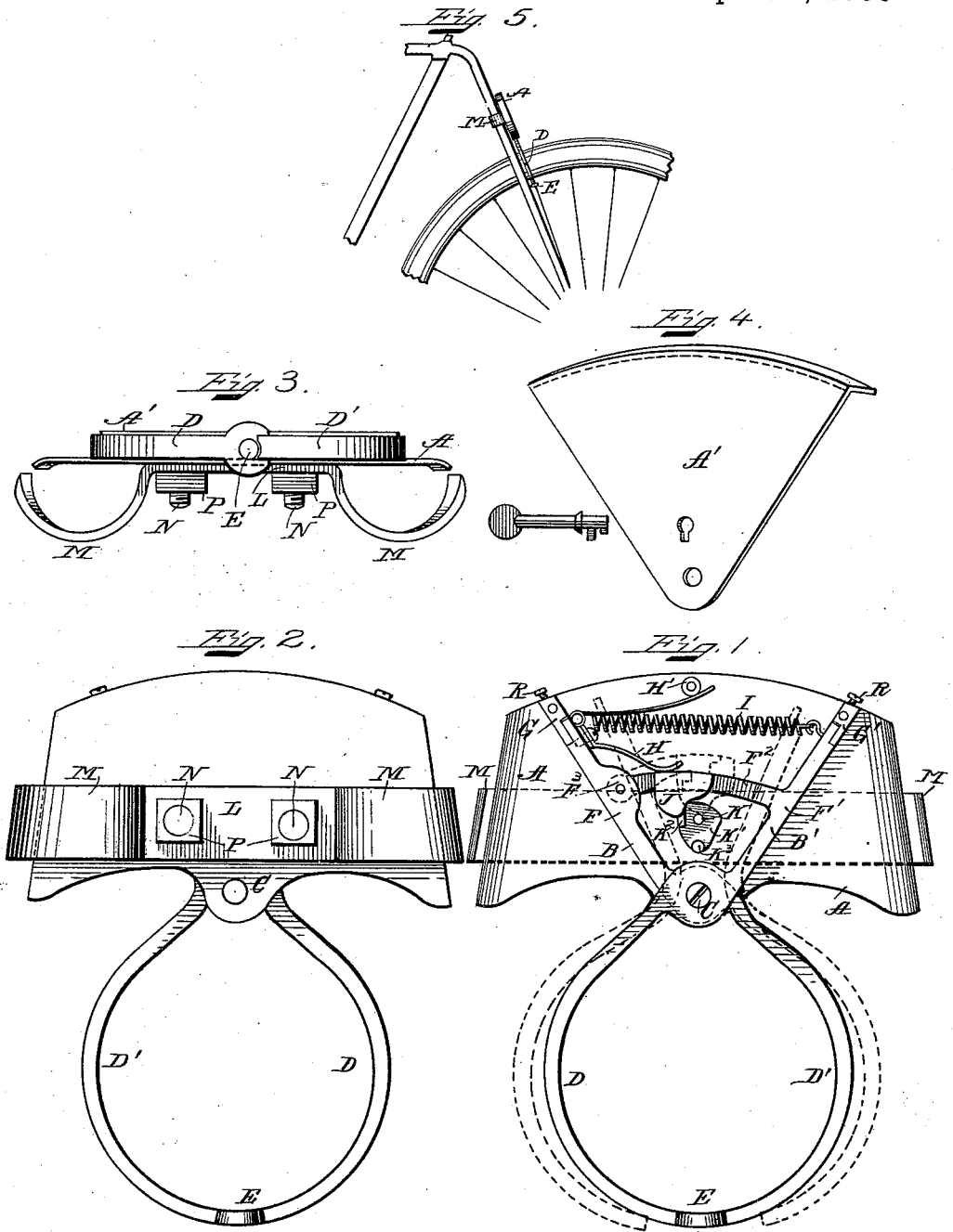

ALBERT KELLEY, OF BOSTON, MASSACHUSETTS.

BICYCLE-LOCK.

SPECIFICATION forming part of Letters Patent No. 538,170, dated April 23, 1895.

Application filed July 23, 1894. Serial No. 518,303. (No model.)

*To all whom it may concern:*

Be it known that I, ALBERT KELLEY, of Boston, in the county of Suffolk and State of Massachusetts, have invented a new and useful Improvement in Bicycle-Locks, which will, in connection with the accompanying drawings, be hereinafter fully described, and specifically defined in the appended claims.

Figure 1 is a front elevation of my improved lock with the face plate removed to show its interior construction, the solid lines showing the locking arms closed together as when locked, and the broken lines as unlocked and open. Fig. 2 is a rear elevation of the lock showing across the back thereof the clamping piece or clasp by which it is attached to the frame of the bicycle. Fig. 3 is an edge view of the lock in the direction of the arrow in Fig. 1. Fig. 4 represents a perspective of the face plate removed from Fig. 1, and a view of the key to the lock. Fig. 5 is an illustrative view of a portion of a bicycle wheel and frame, and showing the lock as attached thereto.

My lock consists of a case A to which are pivoted two levers B and B' by a pivotal screw stud C. The curved arms D and D' of the levers B and B' when in practical use embrace the pneumatic tire or rim of the wheel as illustrated in Fig. 5, and the outer ends of these arms, being formed and arranged to interlock with each other as shown in Fig. 3, when so attached to the bicycle and locked to the wheel embrace one of the wire spokes of the wheel, the spoke being held in the small round aperture E, thus preventing the wheel from being turned. The incased arms F and F' of levers B and B' are notched at their upper ends and when thrown apart by the locking together of the ends of arms D and D' they rest against corresponding stops G and G' which are riveted to the case. Arm F has formed thereon a branch F² which extends toward arm F. Arm F carries a pivoted branch F³ which extends toward branch F² and the two branches are notched or formed with shoulders at their inner ends and interlock with each other, as shown by dotted lines in Fig. 1, when the arms D and D' are locked together at E, as clearly shown in Fig. 3. The pivoted branch F³ is pressed downward, to interlock its free end with branch F², by means of a spring H which is coiled about a screw that secures it to the upper end of arm F, as shown, and has one end bearing down upon the back of branch F³ while the other end bears up under a stud H' secured to the case. A spiral spring I is stretched across from a hook in the upper end of arm F to a hook in the upper end of arm F' and serves to draw the two arms toward each other and to force apart the arms D and D' when the ends of branches F² and F³ are unlocked. A key plate J of irregular outlines is attached to the pivoted branch F³ and overlaps the end of branch F² and extends below the two, as shown.

As represented in unbroken lines in Fig. 1, the parts are locked as when securing the wheel from turning. To unlock them a key is inserted through the keyhole in plate A', the hollow shank of the key fitting onto a stud K projecting from a boss K' in the case, in the usual way, while its bit is adapted to be turned past a ward K² up against the under side or edge of plate J and to thereby raise the plate against the force of spring H and with it the end of branch F³, to which it is attached, thus releasing said branch from the end of branch F², when the contractile force of spring I will draw the arms F and F' toward each other and force apart arms D and D' and release the wheel from the lock. When the arms F and F' are thus drawn inward the branch F³ passes over branch F² as indicated by the broken lines in Fig. 1. To lock the wheel again it is only necessary to clasp arms D and D' with the hand and press them together against the force of spring I until the parts are in position to allow spring H to operate to throw down branch F³ again and thus automatically interlock its end with the end of branch F² as before. In this manner the wheel is instantly and securely locked by a mere pressure of the hand, but the use of a key is required to release it. When unlocked by the use of the key the arms D and D' are automatically thrown open, or apart, by the force of spring I, and remain free from contact or interference with the wheel until pressed together as before stated; and in this position the lock will be conveniently carried when attached to the frame of the bicycle as illustrated in Fig. 5, and as will now be explained.

To attach the lock to the frame of the bicycle a clamping piece or clasp L having curved ends M, M, as shown in Fig. 3, is attached to the back of the lock case by means of light bolts N, N, and nuts P, P, the bolts passing through the case A and clasp L, and being adjustably secured by the nuts P to the branches of the bicycle frame which pass between the curved ends M of the clasp and the back of case A, and are clamped tightly therein by turning the nuts. Thus the lock is securely attached to the bicycle, and, being light and not in the way of the rider, or in any manner inconvenient, may be used as a permanent attachment to the wheel. When unlocked there is perfectly free play of the tire of the wheel between arms D and D'. When plate A' is in place it forms part of the lock case and is secured to the stops G and G' by screws R, R, or in any other suitable manner, and by the pivotal screw C which holds the plate at that point on to a bearing pin $K^3$, which projects from boss K' and prevents undue pressure of the plate upon the locking levers B and B' and consequent interference with their free movement.

It is deemed preferable but not absolutely essential that a spoke of the wheel should be held between the ends of the locking levers D and D' at E, as the encircling of the rim between the spokes will securely lock the wheel from turning, except to a slight extent, and embracing the spoke only makes the locking a little more positive and rigid.

It is obvious that modifications in the details of construction may be made without departing from the essential features of my invention, which consists mainly in the construction whereby the lock is adapted to be securely clasped to the frame of the bicycle and is provided with locking arms which encircle the rim of the wheel, thus locking the wheel to the frame; and such locking of the arms being effected by inclosed mechanism which is partially automatic in its operation.

I claim—

1. A bicycle lock consisting of a case A; suitable attachments to the case by which to secure it to the bicycle frame; levers B and B' pivoted within the case and provided with projecting arms D and D' formed to encircle the rim of the wheel, and with interlocking branches $F^2$ and $F^3$; an actuating spring H operating to lock the branches; and an actuating spring I operating to release the wheel from arms D when the branches are unlocked; all substantially as and for the purposes specified.

2. A bicycle lock consisting of a case A; a clasp L attached to said case; levers B and B' pivoted to the case, lever B having a projecting curved arm D, and being provided with a pivoted branch $F^3$, and lever B' having a corresponding curved arm D' and rigid branch $F^2$, the branches being constructed and arranged to interlock as described, and adapted to be released from each other by means of a key; a spring H arranged to act on branch $F^3$; and a spring I connecting arms F and F' of levers B and B', and operating to draw said arms together and to spread arms D and D', all substantially as and for the purposes specified.

ALBERT KELLEY.

Witnesses:
EUGENE HUMPHREY,
JOHN Q. ADAMS.